3,365,505
NOVEL HALOGENATED COMPOUNDS
AND METHODS FOR THE PREPARA-
TION THEREOF
John R. Norell, Bartlesville, Okla., assignor to Phillips
Petroleum Company, a corporation of Delaware
No Drawing. Filed Oct. 22, 1965, Ser. No. 502,527
3 Claims. (Cl. 260—648)

ABSTRACT OF THE DISCLOSURE

Halogenated derivatives of 1,2-bis(3-cyclohexen-1-yl)ethylene.

---

The present invention relates to novel halogenated compounds and to methods of preparation. In one aspect, this invention relates to the preparation of 1,2-bis(3,4-dihalocyclohexyl)-1,2-dihaloethane. In another aspect this invention relates to the preparation of the above-identified compounds by the addition of halogen atoms to one or more of the double bonds of 1,2-bis(3-cyclohexen-1-yl)ethylene.

The starting material of this invention is described in a copending application of D. L. Crain (Serial No. 502,544) which is assigned to a common assignee, Phillips Petroleum Company of Bartlesville, Oklahoma, this compound being prepared by contacting 4-vinylcyclohexene with a molybdenum or tungsten containing catalyst.

One of the objects of this invention is to provide a process for the halogenation of 1,2-bis(3-cyclohexen-1-yl)ethylene including methyl and ethyl substituted derivatives thereof.

It is another object of this invention to provide novel halogenated derivatives of 1,2-bis(3-cyclohexen-1-yl)ethylene.

Another object of this invention is to produce 1,2-bis(3,4-dichlorocyclohexyl)-1,2-dichloroethane and 1,2-bis(3,4-dibromocyclohexyl)-1,2-dibromoethane.

Other objects and many of the attendant advantages of this invention will be readily appreciated as the same becomes better understood by reference to the following detailed description.

Halogen derivatives of the present invention are prepared by reacting a triolefin compound characterized by the formula:

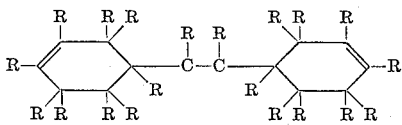

wherein R is at least one member selected from the group consisting of hydrogen, methyl and ethyl, the total number of carbon atoms in all of said R groups preferably being not greater than 8, with a halogen selected from the group consisting of chlorine and bromine, preferably in an inert reaction medium. By the term inert, it is intended to include reaction solvents which are non-reactive with either the halogen reactant or the halogen-containing product. Suitable reaction solvents include organic acids such as acetic, propionic and the like; chlorinated paraffins such as chloroform and carbon tetrachloride; aromatic hydrocarbons such as benzene and toluene; paraffins and cycloparaffins such as n-hexane, isooctane, cyclohexane, methylcyclohexane, and the like; aliphatic alcohols such as methanol, ethanol, isopropanol, and the like; dialkyl ethers such as diethyl ether and di-n-propyl ether, cyclic ethers such as tetrahydrofuran and dioxane.

The concentration of the triolefin in the reaction diluent can vary over a wide range, but the solution of triene in solvent will generally contain from about 1–50 weight percent of 1,2-bis(3-cyclohexen-1-yl)ethylene, preferably from 5–25 weight percent on the same basis.

Some examples of triolefins useful in the practice of this invention are as follows:

1,2-bis(3-cyclohexen-1-yl)ethylene
1,2-bis(1-methyl-3-cyclohexen-1-yl)ethylene
1,2-bis(2-methyl-3-cyclohexen-1-yl)ethylene
1,2-bis(3-ethyl-3-cyclohexen-1-yl)ethylene
1,2-bis(4-methyl-3-cyclohexen-1-yl)ethylene
1,2-bis(5-ethyl-3-cyclohexen-1-yl)ethylene
1,2-bis(6,6-dimethyl-3-cyclohexen-1-yl)ethylene
3,4-bis(3-cyclohexen-1-yl)-3-hexene
1,2-bis(2,6-dimethyl-3-cyclohexen-1-yl)ethylene
2,3-bis(3-methyl-3-cyclohexen-1-yl)-2-butene
1,2-bis(1,3-dimethyl-3-cyclohexen-1-yl)ethylene
2,3-bis(4-methyl-3-cyclohexen-1-yl)-2-butene
1,2-bis(1,4-dimethyl-3-cyclohexen-1-yl)ethylene
1,2-bis(5,6-dimethyl-3-cyclohexen-1-yl)ethylene
2,3-bis(1,3,4-trimethyl-3-cyclohexen-1-yl)-2-butene
1,2-bis(2,5,6-trimethyl-3-cyclohexen-1-yl)ethylene
1,2-bis(2,6-diethyl-3-cyclohexen-1-yl)ethylene
3,4-bis(4-ethyl-3-cyclohexen-1-yl)-3-hexene
1-(3-methyl-3-cyclohexen-1-yl)-2-(2-methyl-6-ethyl-3-cyclohexen-1-yl)ethylene
1-(3-cyclohexen-1-yl)-2-(2-methyl-3-cyclohexen-1-yl)ethylene The process is normally carried out at a temperature below 100° C., preferably below 50° C. and more usually at a reaction temperature ranging from −10 to 25° C. The mol ratio of either chlorine or bromine to triene will generally be about 3:1, preferably not over a 5–10 percent excess over and above this 3:1 ratio. The halogen is usually added to the triene gradually and the rate should be sufficiently slow to maintain a temperature within the desired range. It is to be understood that this rate of addition can be increased as the efficiency of the cooling is increased.

The process can be carried out as a batch or a continuous process, preferably on a batch basis. One convenient method for carrying out the reaction is to dissolve the 1,2-bis(3-cyclohexen-1-yl)ethylene in one of the above-defined solvents, and thereafter add the halogen at a rate sufficiently slow and with proper cooling to maintain the temperature at the desired level. In the case of bromine, the bromine can be added dropwise to the reaction mixture, while in the case of chlorine, the chlorine can be bubbled into the reaction mixture at a reasonable rate.

These halogenated derivatives of 1,2-bis(3-cyclohexen-1-yl)ethylene have many diversified uses, for instance they can be used as insecticides, as fungicides, as flame retardants for polyolefins, etc. A particularly valuable utility is as flame retardants in polyolefins such as polyethylene and polypropylene.

Examples of halogenated compounds produced according to the teaching of this invention and having the formula:

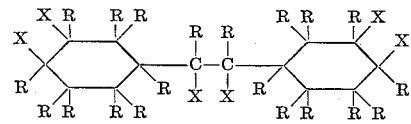

where R is at least one member selected from the group consisting of hydrogen and methyl and ethyl radicals, the total number of carbon atoms in all of said R groups preferably being not greater than 8, and X is a halogen selected from the group consisting of chlorine and bromine, are as follows:

1,2-bis(3,4-dichlorocyclohexyl)-1,2-dichloroethane
1,2-bis(3,4-dibromocyclohexyl)-1,2-dibromoethane 1,2-bis(1-methyl-3,4-dichlorocyclohexyl)-1,2-dichloroethane
1,2-bis(2-methyl-3,4-dibromocyclohexyl)-1,2-dibromoethane
1,2-bis(3-ethyl-3,4-dichlorocyclohexyl)-1,2-dichloroethane
1,2-bis(4-methyl-3,4-dibromocyclohexyl)-1,2-dibromoethane
1,2-bis(5-ethyl-3,4-dichlorocyclohexyl)-1,2-dichloroethane
1,2-bis(2,2-dimethyl-4,5-dibromocyclohexyl)-1,2-dibromoethane
3,4-bis(3,4-dichlorocyclohexyl)-3,4-dichlorohexane
1,2-bis(2,6-dimethyl-3,4-dichlorocyclohexyl)-1,2-dichloroethane
2,3-bis(3-methyl-3,4-dibromocyclohexyl)-2,3-dibromobutane
1,2-bis(1,3-dimethyl-3,4-dichlorocyclohexyl)-1,2-dichloroethane
2,3-bis(4-methyl-3,4-dibromocyclohexyl)-2,3-dibromobutane
1,2-bis(1,4-dimethyl-3,4-dichlorocyclohexyl)-1,2-dichloroethane
1,2-bis(2,3-dimethyl-4,5-dibromocyclohexyl)-1,2-dibromoethane
2,3-bis(1,3,4-trimethyl-3,4-dichlorocyclohexyl)-2,3-dichlorobutane
1,2-bis(2,5,6-trimethyl-3,4-dibromocyclohexyl)-1,2-dibromoethane
1,2-bis(2,6-diethyl-3,4-dichlorocyclohexyl)-1,2-dichloroethane
3,4-bis(4-ethyl-3,4-dibromocyclohexyl)-3,4-dibromohexane
1-(3-methyl-3,4-dichlorocyclohexyl)-2-(2-methyl-6-ethyl-3,4-dichlorocyclohexyl)-1,2-dichloroethane
1-(3,4-dibromocyclohexyl)-2-(2-methyl-3,4-dibromocyclohexyl)-1,2-dibromoethane In order to illustrate the advantages of the process of this invention, the following specific examples are offered, but it is not intended that the invention be limited to the specific features shown in these examples.

EXAMPLE I

In this run, 9.4 grams (0.05 mol) of 1,2-bis(3-cyclohexen-1-yl)ethylene was dissolved in 60 ml. of chloroform and the mixture cooled to 0° C. Bromine (24.0 grams, 0.15 mol) dissolved in 20 ml. of $CHCl_3$ was added over a period of one hour at a rate such that the temperature never rose above 10° C. After the addition was complete, the mixture was stirred for 10 minutes and then filtered. The white precipitate collected was washed with chloroform and dried to yield 21.1 grams (63.5 percent) of the white hexabromo derivative. M.P. 217–231° C. (dec.). Recrystallization from dioxane gave a product decomposing at 246–248° C. An elemental analysis of the recrystallized product gave the following results:

| Element | Calculated for $C_{14}H_{20}Br_6$, wt. percent | Found, wt. percent |
|---|---|---|
| Carbon | 25.2 | 25.3 |
| Hydrogen | 3.0 | 3.1 |
| Bromine | 71.8 | 71.6 |

EXAMPLE II

Another run was carried out in which 1,2-bis(3-cyclohexen-1-yl)ethylene was converted to 1,2-bis(3,4-dichlorocyclohexyl)-1,2-dichloroethane according to the process of this invention.

In this run, 37.6 grams (0.20 mol) of 1,2-bis(3-cyclohexen-1-yl)ethylene, 200 ml. of chloroform and 0.3 gram of $FeCl_3$ were placed in a 200 ml. flask and cooled to 0° C. Chlorine was then introduced into the flask at a rate of 10 liters of gas per hour, and the temperature was maintained at 8° C. Chlorine was introduced for about 2 hours, after which the system was flushed with nitrogen to remove unreacted chlorine, after which the yellow solution was filtered. A solid white product (14.1 g.), M.P. 214–230° C., was obtained.

The product was recrystallized from approximately 500 ml. of ethyl acetate. All of the material did not go into the solution, so while the solution was hot, it was filtered and the residue obtained was dried and subjected to elemental analysis. This material which was analyzed had a melting point of 248–251° C. with decomposition at 255° C. and a clear melt at 260° C. The results of the elemental analysis were as follows:

| Element | Calculated for $C_{14}H_{20}Cl_6$, wt. percent | Found, wt. percent |
|---|---|---|
| Carbon | 41.9 | 42.0 |
| Hydrogen | 5.0 | 5.1 |
| Chlorine | 53.1 | 52.9 |

The filtrate from the hot filtration was cooled overnight in an icebox and the white crystals which precipitated were dried and analyzed. The results of this elemental analysis are shown in the following table. This material also melted at 248–251° C. with decomposition at 255° C. and a clear melt at 260° C. An elemental analysis of this second solid material gave the following results:

| Element | Calculated for $C_{14}H_{20}Cl_6$, wt. percent | Found, wt. percent |
|---|---|---|
| Carbon | 41.9 | 42.0 |
| Hydrogen | 5.0 | 5.1 |
| Chlorine | 53.1 | 52.8 |

Thus the solid product obtained was 1,2-bis(3,4-dichlorocyclohexyl)-1,2-dichloroethane.

EXAMPLE III

In this run bromine (1438.2 grams, 9.0 mols) dissolved in 300 ml. of chloroform was added dropwise to 564 grams (3.0 mols) of 1,2-bis(3-cyclohexen-1-yl)ethylene over a 3.25 hour period with vigorous stirring at a rate such that the temperature never rose above 10° C. After the addition was complete, stirring was continued for several hours at room temperature after which the precipitate was separated by filtration. The filtrate cake from the filtration was slurried with about 1500 ml. of 10 percent aqueous sodium bicarbonate. After filtering and washing with 100 ml. of chloroform, the product was almost white. The resulting 1,2-bis(3,4-dibromocyclohexyl)-1,2-dibromoethane amounted to 1335.3 grams, representing a yield of 67 percent of theory. After air drying, this material melted with decomposition at 213–215° C.

Repetition of this preparation gave 1382 grams of 1,2-bis(3,4-dibromocyclohexyl)-1,2-dibromoethane, representing 69 percent of theory. This sample melted with decomposition at 209–211° C.

The above-prepared samples were combined, ground to pass through a 60-mesh U.S. screen, and vacuum dried at 60° C. overnight. This composite material melted with decomposition at 212–214° C. An elemental analysis of this composite sample gave the following results:

| Element | Calculated for $C_{14}H_{20}Br_6$, wt. percent | Found, wt. percent |
|---|---|---|
| Carbon | 25.2 | 25.3 |
| Hydrogen | 3.0 | 3.0 |
| Bromine | 71.8 | 71.9 |

Obviously many modifications and variations of the present invention are possible in the light of the above teachings. It is therefore to be understood that within the scope of the appending claims the invention may be practiced otherwise than is specifically described herein.

What is claimed is:

1. A new composition of matter characterized by the formula:

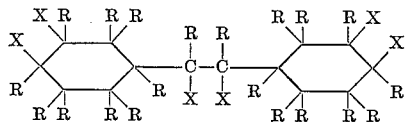

wherein R is at least one member selected from the group consisting of hydrogen, methyl and ethyl, the total number of carbon atoms in all of said R groups being not greater than 8 and X being selected from the group consisting of chlorine and bromine.

2. 1,2-bis(3,4-dichlorocyclohexyl)-1,2-dichloroethane.
3. 1,2-bis(3,4-dibromocyclohexyl)-1,2-dibromoethane.

References Cited

FOREIGN PATENTS 498,242    7/1945    Canada.

LEON ZITVER, *Primary Examiner.*

M. JACOB, *Assistant Examiner.*